United States Patent [19]
Adrian et al.

[11] Patent Number: 5,548,419
[45] Date of Patent: Aug. 20, 1996

[54] STEREO MULTIPLEXED HOLOGRAPHIC PARTICLE IMAGE VELOCIMETER

[75] Inventors: Ronald J. Adrian, Champaign; Donald H. Barnhart; George A. Papen, both of Urbana, all of Ill.

[73] Assignee: University of Illinois, Champaign/Urbana, Ill.

[21] Appl. No.: 262,232

[22] Filed: Jun. 20, 1994

[51] Int. Cl.⁶ .......................... G02B 27/22; G01B 9/025; G03H 1/28
[52] U.S. Cl. .................. 359/24; 359/28; 359/10
[58] Field of Search .................. 359/10, 11, 22, 359/24, 28, 30

[56] References Cited

U.S. PATENT DOCUMENTS

| | | | |
|---|---|---|---|
| 3,509,761 | 5/1970 | Stetson | 359/24 |
| 3,594,060 | 7/1971 | Lowe | 359/24 |
| 3,606,519 | 9/1971 | Kurtz | 359/24 |
| 3,615,123 | 10/1971 | Wuerker | 359/24 |
| 3,644,047 | 2/1972 | Brown et al. | 359/28 |
| 3,709,605 | 1/1973 | Tsuruta | 359/24 |
| 3,715,164 | 2/1973 | Heflinger | 359/24 |
| 3,728,006 | 4/1973 | Brooks et al. | 359/24 |
| 3,752,556 | 8/1973 | Kurtz | 359/28 |
| 3,784,276 | 1/1974 | Wuerker et al. | 359/28 |
| 3,820,869 | 6/1974 | Bolusset et al. | 359/24 |
| 3,888,561 | 6/1975 | Kurtz | 359/28 |
| 4,121,881 | 10/1978 | Bartolini et al. | 359/24 |
| 5,098,176 | 3/1992 | Wolf | 359/24 |
| 5,216,527 | 6/1993 | Sharnoff et al. | 359/24 |

*Primary Examiner*—Jon W. Henry
*Attorney, Agent, or Firm*—Frederick W. Niebuhr, Esq.

[57] ABSTRACT

A holographic particle image velocimeter employs stereoscopic recording of particle images, taken from two different perspectives and at two distinct points in time for each perspective, on a single holographic film plate. The different perspectives are provided by two optical assemblies, each including a collecting lens, a prism and a focusing lens. Collimated laser energy is pulsed through a fluid stream, with elements carried in the stream scattering light, some of which is collected by each collecting lens. The respective focusing lenses are configured to form images of the scattered light near the holographic plate. The particle images stored on the plate are reconstructed using the same optical assemblies employed in recording, by transferring the film plate and optical assemblies as a single integral unit to a reconstruction site. At the reconstruction site, reconstruction beams, phase conjugates of the reference beams used in recording the image, are directed to the plate, then selectively through either one of the optical assemblies, to form an image reflecting the chosen perspective at the two points in time.

26 Claims, 5 Drawing Sheets

STEREO MULTIPLEXED HOLOGRAPHIC PARTICLE IMAGE VELOCIMETER

This invention was made with Government support from the Department of the Navy under Contract No. N00014-90-J-1415, the National Science Foundation under Grant No. ATM-8920605, and the Department of Energy under Grant No. DE-FG05-89ER75508. The Government has certain rights in the invention.

BACKGROUND OF THE INVENTION

The present invention relates to characterizing fluid flows, and more particularly to determining directions and velocities within fluid flows, based on light scattered by particles carried by in fluids.

Particle image velocimetry (PIV) is a well-known technique in which laser light sheets and planar imaging are used to measure in-plane velocity components within a plane of a moving fluid. A fluid is seeded with particles, droplets or other discrete light scattering elements. A selected region within the moving fluid is illuminated by carefully timed coherent light pulses and light scattered by the scattering elements is collected to form images. Successive images reveal displacement of elements within the image field, from which flow velocities are determined.

There are several known methods for obtaining information on three dimensions based on PIV imaging. A stereo camera can photograph the planar light sheet to generate three-dimensional vectors on planar domains. Two or more cameras can generate photographic images of the same volume. However, this technique requires matching of images and tracking of individual particles. The resulting three-dimensional particles have an undesirably large depth of focus, i.e. the particle image length in the viewing direction.

Another approach, holographic imaging, involves forming an interference pattern between an object field including light scattered by particles or other scattering elements and a reference field of the coherent light unaffected by the scattering elements. The interfering fields, simultaneously directed onto a holographic film plate or other medium, form an interference pattern having a fringe spacing on the order of micrometers. The interference pattern is photochemically developed into a three-dimensional grating structure. A holographic image representing the light scattering particles is reconstructed by directing a second reference field onto the film plate, to diffract the reference field off the recorded grating structure to produce the holographic image.

In-line holographic techniques, in which the reference beam and scattered energy beam have the same axis, result in a depth of focus too large for satisfactory spatial resolution, particularly in the viewing direction. Large amounts of speckle noise also present a problem. Providing the reference beam at an off-axis angle improves the depth of focus and reduces speckle noise. However, this approach, like in-line holography, requires a relatively low number of relatively large particles. This factor limits the utility of the approach for studying turbulent flows and the spatial resolution is substantially less than that attainable in planar PIV systems.

Measurements in certain types of fluid flows, e.g. turbulent flows, require high accuracy and spatial resolution in three mutually perpendicular directions, and large volumetric domains with displacement directions, amplitudes and velocities expected to vary considerably over the domains. Accordingly, previous holographic systems that require small numbers of relatively large particles, are not well suited for turbulent flow studies.

Therefore, it is an object of the present invention to provide a holographic particle imaging system with enhanced sensitivity for detecting small particles, to facilitate study of fluid flows with higher densities of particles or other light-scattering elements.

Another object of the invention is to provide a system for holographically recording and reconstructing particle images with spatial resolution comparable to resolution in planar photographic PIV systems.

A further object of the invention is to provide an apparatus for recording several particle images on a single holographic plate in a manner that unambiguously distinguishes the images from one another by time and perspective, and an apparatus for reconstructing the images in combinations selected to facilitate derivation of three-dimensional vector data.

Yet another object is to provide a three-dimensional particle imaging system with substantially reduced particle depths of focus in the viewing direction to provide high spatial resolution in three mutually perpendicular directions.

SUMMARY OF THE INVENTION

To achieve these and other objects, there is provided a system for holographically recording images produced by a moving fluid. The system includes a means for generating coherent illuminating energy in the form of temporally spaced pulses and for directing the pulsed energy in a path that intersects a fluid stream including a fluid and light-scattering elements carried in the fluid. The pulsed energy illuminates a volumetric region within the fluid stream whereby elements within the region scatter the coherent energy. A holographic recording means, spaced apart from the volumetric region, receives first and second images during each of the pulses. The first and second images are based on respective first and second viewing perspectives relative to the volumetric region. A referencing means directs a first reference beam of coherent energy onto the holographic recording means during a first one of the pulses. During a second one of the pulses, the referencing means directs a second reference beam onto the holographic recording means. Consequently, the holographic recording means records two images —one image based on each of the first and second perspectives —corresponding to each of the first and second pulses. Means are provided for distinguishing the images recorded during the first pulse from the images recorded during the second pulse.

Preferably the illuminating energy is a laser beam, collimated at least along the portion that illuminates the volumetric region. The first and second reference beams likewise are collimated and preferably are directed onto the holographic recording means at different reference angles. The respective angles provide a means for unambiguously distinguishing images recorded during the first pulse from images recorded during the second pulse, a particularly useful feature when the holographic recording means is a single holographic film plate.

Ideally, the first and second viewing perspectives differ considerably from one another, to enhance reconstruction of the three-dimensional image. To this end, the holographic recording means can comprise two separate holographic film plates, spaced apart from one another so that linear paths for scattered light from the volumetric region to the two plates are separated angularly by at least 20 degrees, and more preferably 30 degrees or more. When the recording means is a single holographic plate, the desired angular separation is achieved by interposing two optical assemblies between the volumetric region and the holographic plate, one of the optical systems corresponding to each of the viewing perspectives. According to one particularly advantageous arrangement, each optical system includes a collecting lens receiving images from the volumetric region, an optical prism for redirecting the image, and a converging lens for refocusing the image near a receiving surface of the holographic plate.

After the first and second pulses, four images are recorded on the holographic recording means: an image from the first viewing perspective and an image from the second viewing perspective, both corresponding to a first point in time; and a second image from each viewing perspective corresponding to a second point in time. The differing reference beam angles unambiguously identify the pair of images as to point in time. Likewise, the differing geometry distinguishes the images relating to the first viewing perspective from those that correspond to the second perspective.

Further in accordance with the invention there is provided a system for stereographic reconstruction of holographic images of a fluid flow. The system includes a holographic storage medium. The information stored onto the holographic medium includes pairs of images stored at respective first and second points in time. Each pair of images includes an image corresponding to a first viewing perspective and a second viewing perspective relative to a volumetric region within a fluid flow. Means are provided for selectively directing coherent energy onto the holographic storage medium to generate a first reconstructed image corresponding to the first viewing perspective at the first and second points in time, and a second reconstructed image that corresponds to the second viewing perspective at the first and second points in time.

In combination with the above-discussed image recording system, stereographic reconstruction provides high spatial resolution in three dimensions leading to accurate and reliable flow velocity information in the volumetric region under study. In the most preferred approach, a single holographic plate and the pair of optical assemblies between the volumetric region and plate are integral, and transferrable as a unit from the viewing environment to an image reconstruction environment. When aligned in the reconstruction environment, the holographic plate is subjected alternately to two reconstruction beams of coherent energy, each corresponding to one of the reference beams employed in recording the image. More particularly, each reconstruction beam is the phase conjugate of its corresponding reference beam and is directed to the holographic plate from behind, in the direction opposite to that of reference beam propagation toward the plate. The resultant holographic image propagates back through the same optical systems used to record the image. The original phase front is recovered and aberrations in the optical systems are removed. The result is a real image of the volumetric region. A charge coupled device (CCD) array is used to interrogate the image. The CCD array is controllably stepped through the volume, sampling the volume in planar segments. At each position of the array, one of the optical assemblies is blocked (preventing light transmission) while the reconstruction beams are alternately applied to the holographic plate. The resulting image is composite from the chosen perspective, during both points in time. The process is repeated with light transmitted through the other optical assembly to form another composite image including both points in time from the other perspective.

Given the composite images from two different perspectives, measurement of out-of-plane particle positions can be determined from the intersections the two particle images. The resulting depth of the intersection is on the order of 10 microns, approximately two orders of magnitude less than the typical 1 mm depth of focus for a single image. This yields a dramatic improvement in spatial resolution, particularly in the viewing direction. Based on the improved spatial resolution, the holographic images provide three dimensional velocity vector information with accuracy comparable to that of photographic planar PIV systems.

IN THE DRAWINGS

For a further understanding of the above and other features and advantages, reference is made to the following detailed description and to the drawings, in which.

DETAILED DESCRIPTION OF THE PREFERRED EMBODIMENTS

Figure 1:
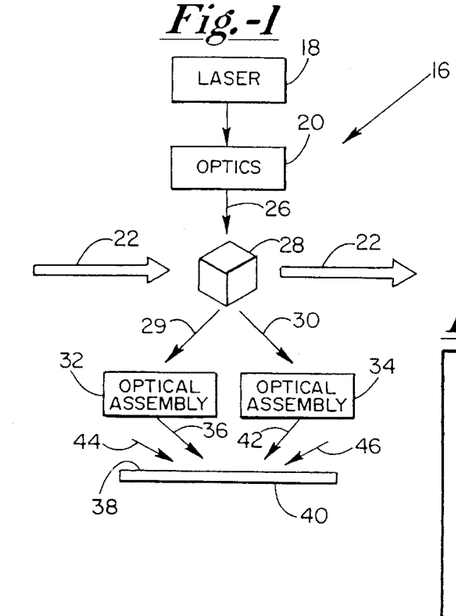
FIG. 1 is a schematic view of a holographic image recording system constructed according to the present invention.

Turning now to the drawings, there is shown in FIG. 1 a system 16 for stereoscopic multiplexed recording of holographic images used to determine localized fluid displacements and velocities in a fluid stream carrying particles, droplets or other discrete light scattering elements.

A laser, more particularly a twin synchronized, injection seeded, frequency doubled Nd:YAG laser 18, generates coherent energy to illuminate the fluid under study. Energy is generated in 300 mJ pulses and at a wavelength of 532 nm. Optics 20 direct the output of laser 18 toward a fluid stream indicated by arrows at 22, and shape the laser output so that a collimated beam 26 intersects the fluid stream to illuminate a flow volume or volumetric region 28 within the fluid stream. Arrows 22 are shown parallel to one another as a matter of convenience in illustration, and are not intended to suggest that fluid stream 22 is laminar. In fact, the present system is particularly well suited for characterizing turbulent flows.

The fluid stream is composed of a fluid and individual light scattering elements carried within the fluid. For example, oil droplets having diameters of about 0.5–1 microns are entrained within air or another gas in a concentration of about ten droplets per cubic millimeter. Micron or submicron particles can be employed in lieu of the droplets.

As compared to fluid streams suitable for study with previous holographic recording systems, particle diameters are substantially reduced and the density (in terms of particles per unit volume) is substantially increased. These departures are enabled by enhanced sensitivity arising from the manner in which the holographic images are recorded and later reconstructed.

Whenever region 28 is illuminated, oil droplets scatter the coherent energy in multiple directions. Of primary interest is that portion of the scattered light indicated by arrows at 29 and 30 and collected by optical assemblies 32 and 34 respectively. The optical assemblies are spaced apart from one another a sufficient distance to receive scattered light from region 28 at substantially different angles. More particularly, the scattered light paths 29 and 30 are angularly separated by at least 20 degrees, and more preferably 30 degrees or more, to provide substantially different viewing perspectives of volumetric region 28. Each optical assembly redirects and shapes the scattered energy it receives. Optical assembly 32, for example, redirects coherent energy as an object beam 36 toward a light receiving or collecting surface 38 of a holographic film plate 40. Further, object beam 36 is shaped by the optical assembly to focus the image of region 28 near collecting surface 38. Optical assembly 34 similarly reshapes and redirects an object beam 42 to image region 28 near the collecting surface.

The components of optical assemblies 32 and 34 preferably have low f-numbers to produce particle depths of focus less than 1 mm, and to provide an f-number of about 3 for the system. Large aperture optics also are preferred. However, due to the expense of such optics, less costly optics are preferably employed with phase conjugate reconstruction.

Arrows at 44 and 46 indicate reference beams, which are synchronized with the pulsing of laser 18 to alternatively direct either reference beam 44 or reference beam 46 onto the holographic plate, simultaneously with the scattered light from optical assemblies 32 and 34. Reference beams 44 and 46 are directed toward the plate at a selected reference beam angle of about 40 degrees relative to the collecting surface, although a range of angles, including angles above 60 degrees, may be employed. The selected reference beam interferes with object beams 36 and 42. The resulting interference pattern, stored on the holographic plate, is a composite of two images, one from the perspective of each optical assembly. The result is a three-dimensional grating structure within the film emulsion, based on the interference pattern.

Figure 2:
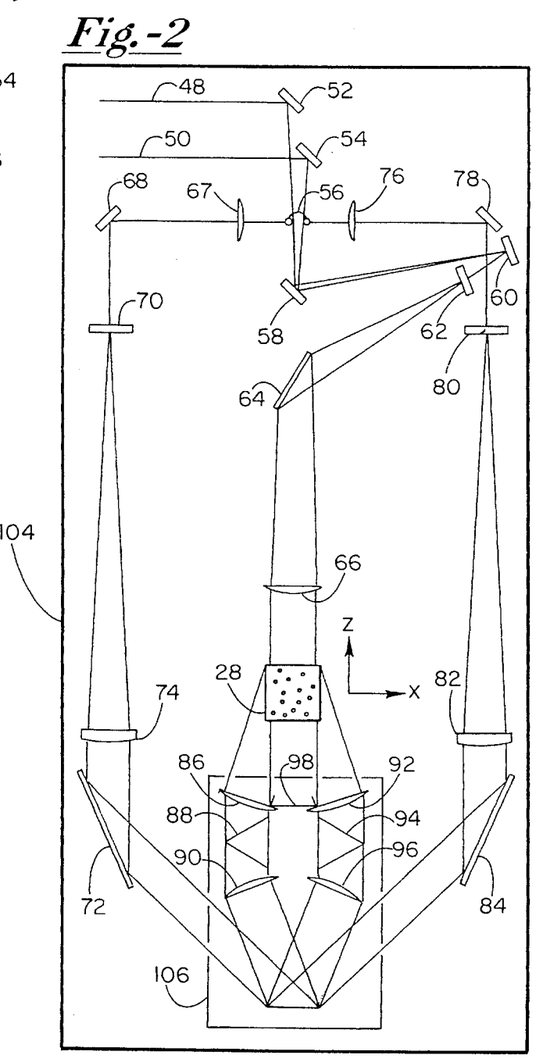
FIG. 2 is a more detailed view of part of the system in FIG. 1.

As seen in FIG. 2, laser 18 generates the reference beams as well as the illuminating beam to insure their synchronization. Double pulses from laser 18 are shown as beams 48 and 50 directed to mirrors 52 and 54, respectively, and then to a beam splitter 56. The beam splitter transmits portions of both beams to a mirror 58, then to convergence at a mirror 60. A lens 62 expands the beams, which at this point are coincident. A mirror 64 directs the expanding beams to a collimating lens 66 which provides the collimated beam to illuminate volumetric region 28.

To provide reference beam 44, beam splitter 56 directs a portion of beam 48 through a lens 67 to a mirror 68, and then to an expanding lens 70. The beam is directed onto a mirror 72 through a collimating lens 74, whereby reference beam 44 is collimated.

Similarly, beam splitter 56 directs a portion of beam 50 through a lens 76 to a mirror 78, and then to an expanding lens 80. The beam is collimated by a lens 82 and reflected by a mirror 84 toward the holographic film plate.

Further as seen in FIG. 2, optical assembly 32 includes a collecting lens 86 that receives light scattered by the droplets, an optical prism 88 that directionally diverts the output of lens 86, and a focusing lens 90 that transmits object beam 36 to plate 40. Lens 90 refocuses the beam to form an image of region 28 near plate 40. Similarly, optical assembly 34 includes a collecting lens 92, a prism 94 and a focusing lens 96 to provide a focused image near the holographic plate. A light stop 98 prevents the illumination beam from reaching the holographic plate.

All of the optical components are mounted on an optical table 104 and thus are fixed with respect to one another, subject to adjustments necessary to accurately define the beam paths. Further, assemblies 32 and 34 and holographic plate 40 are mounted integrally on an optical table 106 releasably mounted on table 104. Optical table 106 thus provides a support means for transferring these components from the recording environment (FIGS. 1 and 2) to an image reconstruction environment, discussed below in connection with FIGS. 4 and 5.

Figure 3:
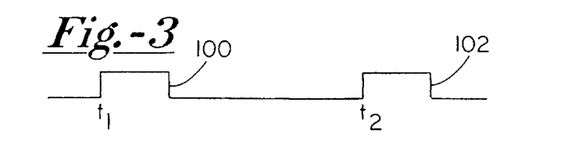
FIG. 3 is a timing diagram illustrating the manner in which a laser of the system is pulsed.

As seen from FIG. 3, laser 18 is selectively pulsed to provide a controlled pair of pulses 100 and 102, each with a selected pulse width of less than 100 ns, preferably in the range of about 10–30 ns. The duration between the pulses is selected with reference to anticipated fluid velocities. More particularly, the maximum expected particle displacement between pulses 100 and 102 must not exceed a fraction (typically ¼) of the size of a resolution cell, in this case about 1 mm. Thus, timing between pulses 100 and 102 is selected to insure an image displacement of at most about 0.25 mm, when travelling at the maximum expected velocity. As one example, pulses of 10 ns in duration were separated from one another by a time of 0.2 ms.

Returning to FIG. 2, laser 18 is controlled to generate beam 48 for a substantially instantaneous (10–30 ns) pulse, then after the predetermined delay t, caused to generate beam 50 as a virtually instantaneous second pulse. Both pulses 48 and 50 illuminate the volumetric region. However, only beam 48 provides reference beam 44, with beam 50 exclusively providing reference beam 46. Due to the different angles at which they are propagated toward plate 40, reference beams 44 and 46 unambiguously identify their associated images as occurring during pulse 100 or pulse 102 respectively. Consequently, the images formed by optical assemblies 32 and 34 are "marked" as to their occurrence in either one of two distinct points in time.

Further, the images produced by optical assemblies 32 and 34 are distinguishable from one another, based on the different geometries arising from the different viewing perspectives. As a result, each pair of pulses 100 and 102 stores four distinguishable images onto the holographic film plate: the perspective of assembly 32 at a first time $t_1$; the perspective of assembly 34 at $t_1$; the first perspective at $t_2$; and the second perspective at $t_2$.

Images resulting from the first and second perspectives are stored simultaneously during time $t_1$ and again simultaneously during time $t_2$. During time $t_1$, reference beam 44 interferes with object beams 36 and 42 to form the interference pattern stored upon the holographic film plate. Likewise during time $t_2$ reference beam 46 interferes with the object beams, and the respective interference patterns are stored onto the holographic plate. The plate then is developed to form a permanent, three-dimensional grating structure within a film emulsion (not shown) on the plate. The grating structure thus is a composite of the four images.

Figure 4:
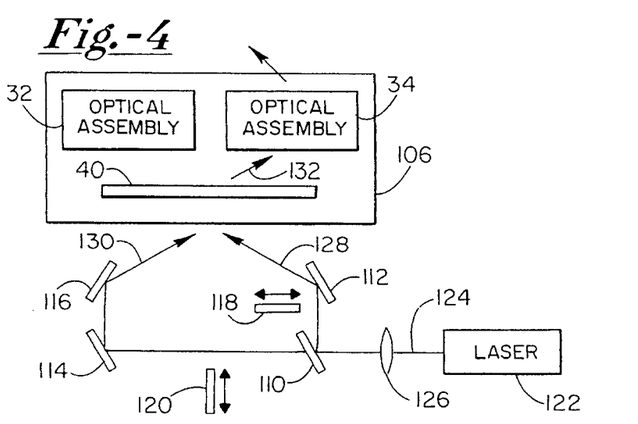
FIG. 4 is a schematic view of a holographic image reconstruction system constructed according to the present invention.
Figure 5:
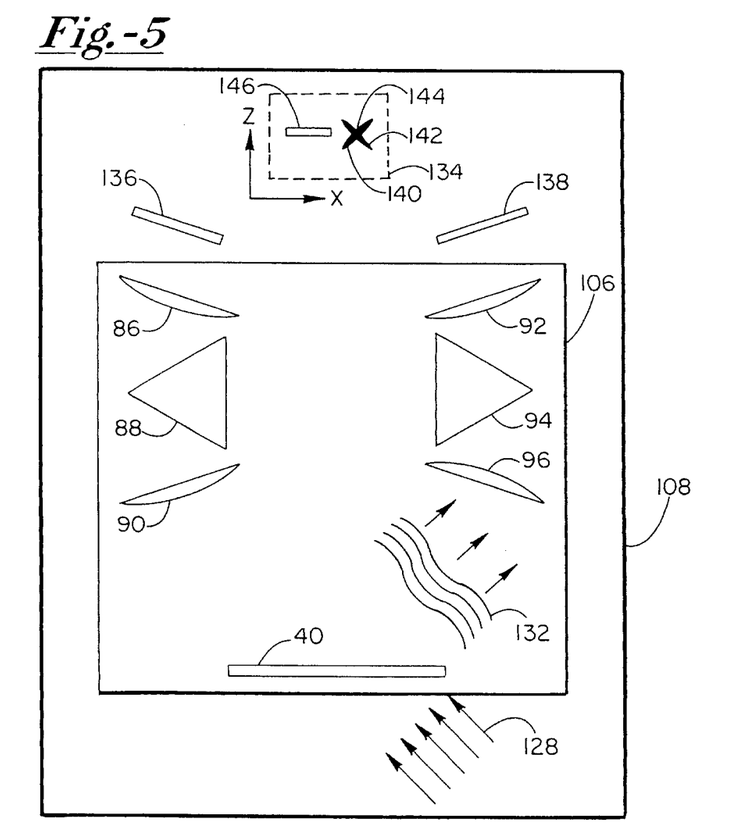
FIG. 5 is a more detailed view of part of the reconstruction system.

FIGS. 4 and 5 show a system for holographically reconstructing the images stored on plate 40. Optical table 106 is releasably mounted onto an optical table 108, whereby the optical assemblies and plate have been transferred as a unit from the image recording to the image reconstruction environment. Also mounted on table 108 are a beam splitter 110, mirrors 112, 114, and 116, and two shutters 118 and 120. A diode pumped, frequency doubled Nd:YAG laser 122 is operated in the cw (continuous wave) mode to generate a beam 124 having a wavelength of 532 nm, i.e. identical to the wavelength generated by laser 18. Collimating optics 126 provide a collimated beam, which is generated at a power substantially less than the power of pulsed beams 48 and 50. At beam splitter 110, a portion of the beam is deflected to mirror 112 to provide a first reconstruction beam 28. Another portion of the beam is transmitted by the beam splitter to mirrors 114 and 116, providing a reconstruction beam 30. Reconstruction beams 128 and 130 are directed toward holographic plate 40, each at an angle of 40 degrees relative to the plate. Shutters 118 and 120 are reciprocable to block beams and are operated in concert to insure that only one of reconstruction beams 128 and 130 reaches plate 140 at any given time.

As seen in FIG. 5, reference beam 128 propagates through the grating structure of holographic plate 40 to produce a diffracted field 132, a portion of which is collected by focusing lens 96. Reconstruction beam 128 is the phase conjugate of reference beam 44. The reconstruction beam is directed toward plate 40 in precisely the opposite direction that reference beam 44 propagates toward the film plate during recording. Consequently, as the diffracted field 132 propagates back through lens 96, prism 94 and lens 92, the original phase front is recovered and aberrations, due to imperfections in the prism and lenses, are removed. The result is a real conjugate image of volumetric region 28, at an imaging location 134. The success of phase conjugate reconstruction requires that reconstructing beam 128 be the exact phase conjugate of reference beam 44. Accordingly it is advisable to construct a planar reference field and form the phase conjugate as another plane wave travelling in the opposite direction. To this end, collimation of the reference and reconstruction beams is crucial for accurate compensation of aberations.

Not only does phase conjugate reconstruction permit use of less costly optical components, these components, because they do not produce a good image unless the reconstruction beam is properly aligned, facilitate use of the image as a guide toward proper alignment of the components with the reconstruction beam.

Beyond optical component imperfections, system 16 is subject to holographic film effects. In particular, chemical processing in film development typically distorts the grating structure, primarily due to shrinkage of the film emulsion. Accordingly, selection of high quality plates and preparation of emulsions with chemicals and methods designed to minimize shrinkage are recommended. Further, the angles of the reference beams and reconstruction beams can be appropriately selected to minimize the impact of emulsion shrinkage. It has been found that absolute image displacement due to film emulsion shrinkage across the entire range of object angles utilized in the imaging system, is minimized when the beam angles relative to the plate are about 60 degrees.

However, performance is satisfactory at a 40 degree angle as well, and the 40 degree angular offset was selected for reasons other than minimizing distortion. Further, the use of optical assemblies to project the flow volume image near the film plate minimizes spatially non-uniform distortion effects in the film. Phase conjugate reconstruction, in turn, compensates for distortions due to the optical components. These techniques in combination produce high quality particle images.

Shutters 136 and 138 are mounted to reciprocate on optical table 108, so that imaging location 134 can selectively receive light either exclusively from optical assembly 32, or only from optical assembly 34. Accordingly, the image created at imaging location 134 contains a selected one of the alternative viewing perspectives. However, as illustrated in FIG. 5, a particle imaged at both perspectives simultaneously forms an intersection of images 140 and 142, each image being ellipsoid and elongate in the viewing direction. The particle images form an intersection volume 144 substantially smaller than the depth of focus for each image, in some cases by several orders of magnitude (e.g. on the order of 10 microns as compared to a 1 mm depth of focus). The intersection is used to determine out-of-plane particle position. Thus, the combination of two perspectives provides substantially improved spatial resolution.

In FIG. 5, phase conjugate reconstruction is shown only for reconstruction beam 128 in connection with optical assembly 34. It is to be understood that reconstruction beams 128 and 130 are used alternately to reconstruct images corresponding to respective times $t_1$ and $t_2$. In practice, the optical path through optical assembly 34 is blocked so that only the view of particles recorded through optical assembly 32 is reconstructed. Then, reconstruction beams 128 and 130 are alternately applied to reconstruct the particle images at $t_1$ and $t_2$. The images at $t_1$ and $t_2$ are reconstructed, digitized and analyzed to provide a two-dimensional displacement field of images as viewed from the first perspective, i.e. through lens 86. Then, the procedure is repeated with optical assembly 32 blocked to allow transmission exclusively through optical assembly 34, to provide the corresponding displacement field of images as viewed through lens 92. During each procedure, a digitizing camera is scanned over numerous planes within the reconstructed volumetric region. Thus, a holographic image stereoscopically recorded is also stereoscopically reconstructed.

Interrogation is performed with a CCD array 146 at imaging location 134. With respect to any given xy plane within the image location, for example a plane 148a, the CCD array is stepped horizontally (to the left and right as viewed in FIGS. 5 and 6) or vertically (perpendicular to the page of the figures) to traverse the entire plane. Once a plane is traversed, CCD array 16 is stepped to a subsequent xy plane 148b. In one preferred system, the CCD array is stepped in approximately 0.5 mm increments for overlapping measurements of 1 mm cells. The preferred distance between adjacent xy planes is about 0.5 mm.

Figure 6:
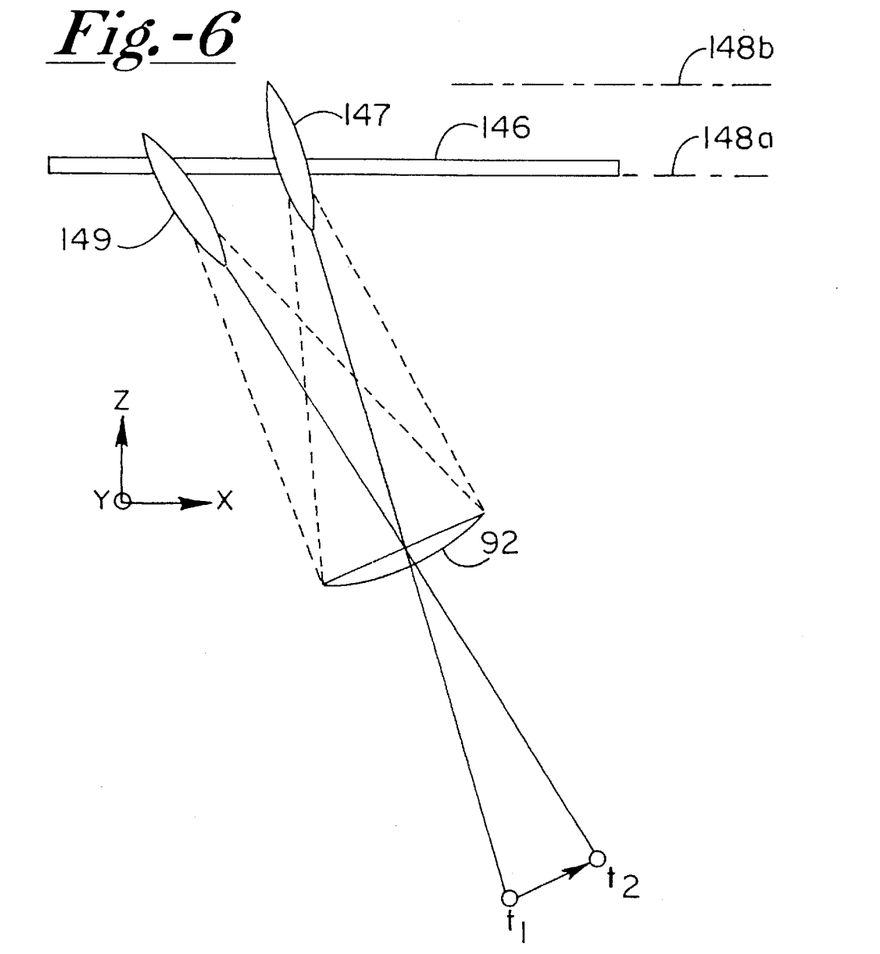
FIG. 6 is a partial view of the reconstruction system illustrating the operation of a CCD array within a reconstructed particle image.

One preferred CCD array is a 1035×1320 pixel array available from Kodak Company. The CCD array is positioned in the xy plane without the lens, in the space of the reconstructed image. CCD array 146 senses a cross section of each particle image, which is slightly larger than the image diameter since particle images intersect the xy plane at an angle inclined relative to the z axis. The video array records the image field at time $t_1$ using first reconstruction beam 128. Next, the array records the image at time $t_2$, reconstructed by reconstruction beam 130. Information characterizing the reconstructed images is transmitted to a computer, in particular to separate buffers corresponding to times $t_1$ and $t_2$, respectively. When the video array is being stepped to the next viewing location in the xy plane, information in the buffers is used to determine the two-dimensional displacements between exposures at $t_1$ and $t_2$, using procedures developed for analysis of two-dimensional photographic particle image velocimetry data. More particularly, the image array is subdivided into interrogation spots that contain several particle images, usually about ten. The displacement of the group of images in each interrogation spot is found by cross-correlating the images of the first and second exposures.

One of the advantages of recording from two viewing perspectives is the ability to reconstruct each view separately. Two viewing directions further make it possible to reconstruct the images with improved intensity in two widely separated directions. This permits the use of micron and submicron light scattering elements, e.g. oil droplets of 0.5–1 micron diameter, as compared to the 30–40 micron particles used in earlier holographic PIV systems. Further, because the two differing perspectives are provided in recording, the different perspectives can be reconstructed while maintaining a constant orientation of the CCD array. With no need to slant or skew the CCD array, the reconstruction procedure is simplified and results are more reliable.

Yet another advantage that arises from recording in different perspectives, and on a single holographic film plate, is that there is no need to match differently oriented images, nor to track individual particles. Further, this approach facilitates cross-correlating of images, as opposed to auto-correlation. Favorable results include unambiguous directional determinations for displacements and velocities, more effective noise suppression for a better SNR (signal-to-noise ratio), and improved sensing of lower velocities to afford a high dynamic range (100–1 or better) for velocity measurements.

As seen in FIG. 6, particle displacement between times $t_1$ and $t_2$ results in two images 147 and 149 intersecting CCD array 146, projecting an image displacement onto the CCD array. Both particle images are inclined relative to the z axis, and also differ slightly in direction from one another, although this difference can be assumed negligible. The same pair of images, viewed from the other perspective, provide a different projection onto the CCD array. Knowledge of the different perspectives and the image directions of viewing provides four equations for determining the three mutually perpendicular components of particle velocity, thus to provide an extra equation as a validity check.

Figure 7:
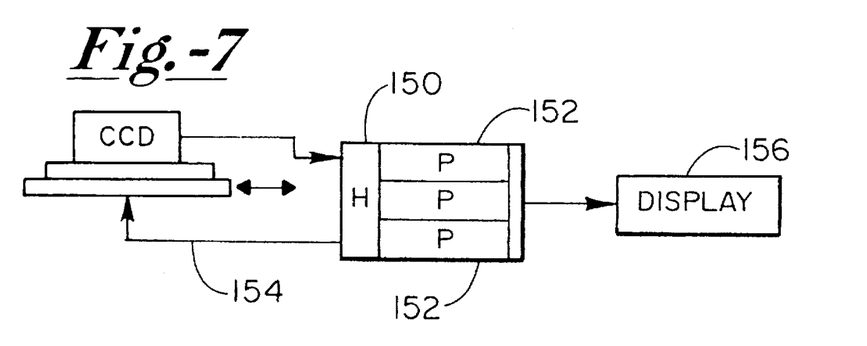
FIG. 7 is a schematic view of a system for interrogating a reconstructed image.

Information acquired by CCD array 146 is provided to a computing array (FIG. 7) including a host processor 150 and several parallel processors 152. The host processor controls the stepping of the CCD array as indicated at 154. Output of the processor array is provided to the display terminal 156 or other appropriate destination.

Figure 8:
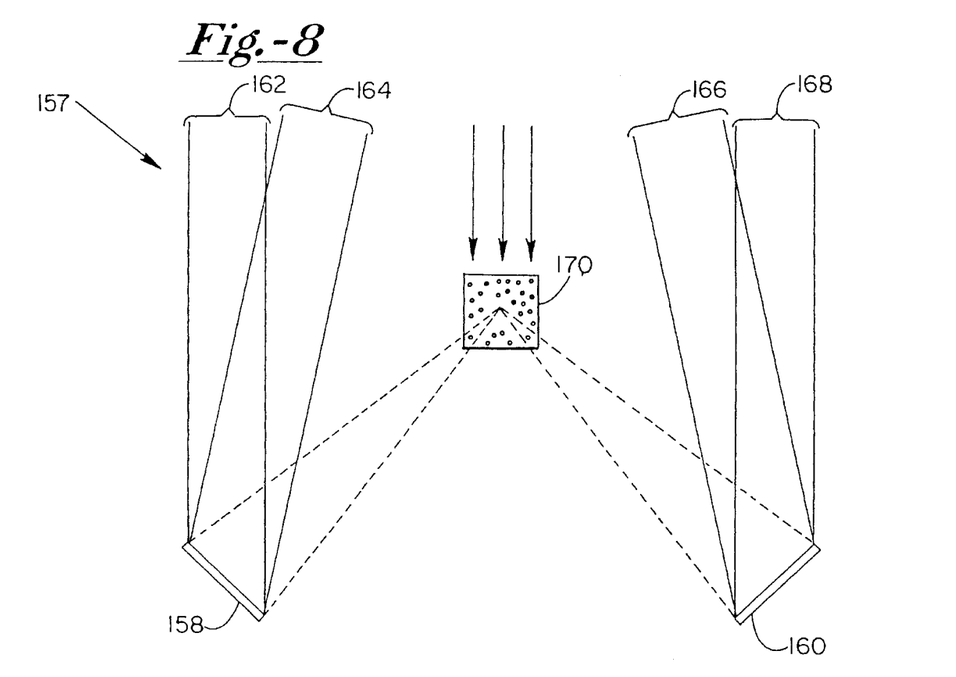
FIGS. 8, 9 and 10 illustrate components of alternative embodiment image recording systems according to the present invention.

FIG. 8 illustrates an alternative embodiment recording system 157 in which the holographic recording means include spaced apart holographic film plates 158 and 160. Reference beams 162 and 164 are directed onto plate 158, while reference beams 166 and 168 are directed onto plate 160. Other components are similar to those in system 16 and thus are not illustrated. A laser similar to laser 18 is fired to provide pairs of substantially instantaneous pulses, thus to illuminate a flow volume 170 substantially instantaneously at times $t_1$ and $t_2$. Reference beams 162 and 166 are active during time $t_1$, while reference beams 164 and 168 are active during time $t_2$. Plates 158 and 160 are spaced apart from one another a distance sufficient to provide substantially differing perspectives of the flow volume. Accordingly, there are no optical assemblies equivalent to assemblies 32 and 34 of system 16.

In connection with this embodiment, it is preferable to provide reference beams 162 and 164 (and reference beams 166 and 168) at different angles, to provide an unambiguous indication of time as discussed above. Parallel reference beams could be directed to the same plate if desired, provided that some other means (e.g. intensity or wavelength variation) is provided to distinguish the reference beams, and thus the timing. Otherwise, the system would lack the capability of determining the directions of velocities and displacements, essentially limiting its use to situations in which flow directions are known. If desired, beams 162 and 166 can be the same beam, as can beams 164 and 168.

Figure 9:
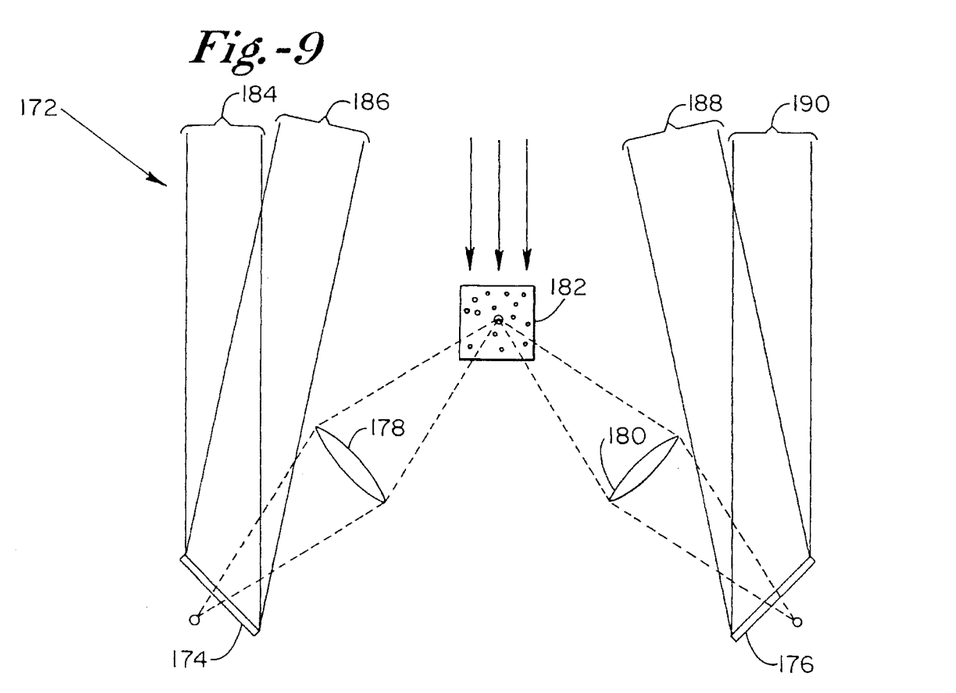

FIG. 9 discloses a recording system 172 similar to system 157 in that separate holographic film plates 174 and 176 are employed. Respective focusing lenses 178 and 180 are interposed between a flow volume 182 and plates 174 and 176, respectively. Each lens forms particle images in a region near its associated one of the plates. This limits the area on each plate that reflects interference of reference beams 184, 186, 188 and 190) with the object beam, which reduces aberrations in the reconstructive image due to shrinkage of the emulsion during processing. As a result, smaller diameter images can be achieved when employing lenses 178 and 180.

Figure 10:
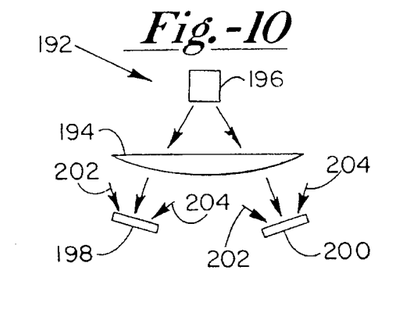

FIG. 10 illustrates in part a further alternative recording system 192 employing a single large lens 194 between a flow volume 196 and holographic plates 198 and 200, alternatively subjected to reference beams 202 and 204. Again, scattered light is transmitted to the plates with each pulse, with reference beams 202 and 204 alternating. In an image reconstruction device corresponding to system 192 (not shown), alternative halves of lens 194 are covered while the plate is alternately subjected to reconstruction beams corresponding as phase conjugates to reference beams 202 and 204, respectively, in the manner discussed above.

Figure 11:
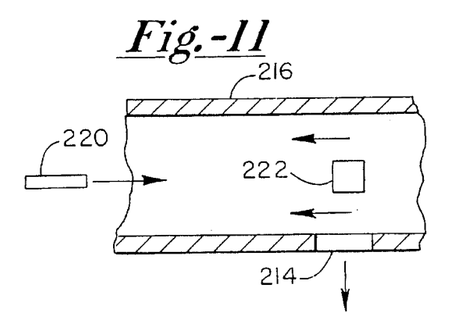
FIGS. 11–13 illustrate a further embodiment image recording and reconstruction system according to the present invention.
Figure 12:
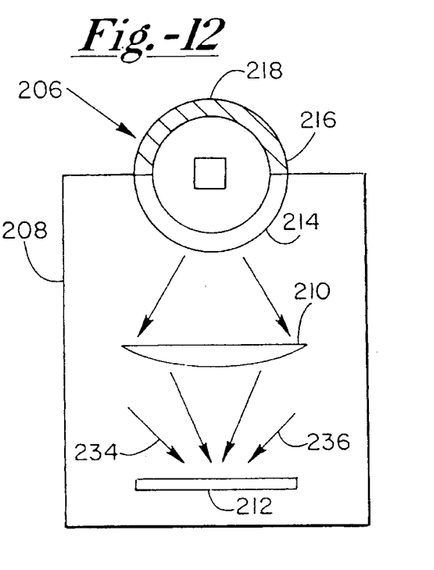
Figure 13:
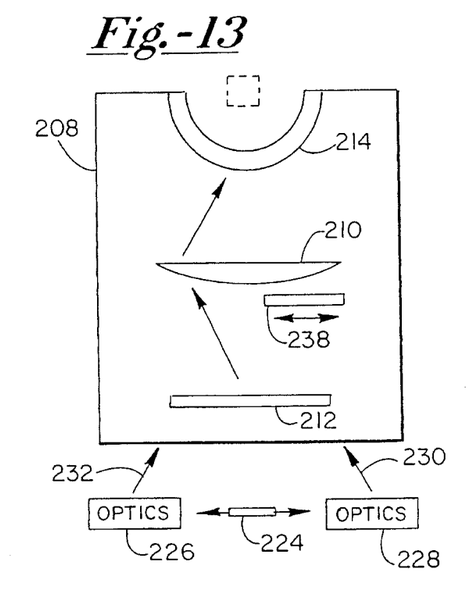

FIGS. 11–13 illustrate a further embodiment image recording and reconstruction system 206 in which an optical table 208 integrally supports a single lens 210 and a holographic film plate 212. Table 208 further supports a semicircular (in section) transparent window section 214 to a pipe 216. Transparent section 214 is removably mounted to an semicircular opaque pipe section 218, and the sections cooperate to provide closure. As best seen in FIG. 11, a laser 220 provides beam introduced within pipe 216 and downstream of a flow volume 222. Accordingly, lens 210 receives light scattered at an approximately 90 degree off-axis angle and transmitted through transparent section 214.

As seen in FIG. 13, table 208, when removed from the recording environment and transferred to a reconstruction setting, transfers lens 210, film plate 212 and transparent section 214 as a unit, for alignment with a laser 224 and associated optics 226 and 228 that provide reconstruction beams 230 and 232.

Beams 230 and 232 are the phase conjugates of respective reference beams 234 and 236 employed to record images of flow volume 222. The reconstruction and reference beams have the same wavelength, and each reconstruction beam is directed oppositely to its counterpart reference beam. Accordingly, system 206 affords complete correction for aberations in optical components, including transparent section 214. A shutter 238 is moveable to alternatively block either half of lens 210, to generate images based on alternative perspectives.

Thus, in accordance with the present invention, holographic images are produced with high spatial resolution in three mutually perpendicular directions. Enhanced sensitivity to smaller light scattering elements enables use of more densely seeded fluids and smaller measurement resolution cells, to significantly improve the study of turbulent flows.

What is claimed is:

1. A system for holographically recording images produced by a moving fluid, including:

a means for generating coherent illuminating energy in the form of temporally spaced pulses, and for directing the pulsed energy in a path that intersects a fluid stream including a fluid and light scattering elements carried in the fluid, said pulsed energy illuminating a volumetric region within the fluid stream whereby the elements within the volumetric region scatter the coherent energy;

a holographic recording means spaced apart from the volumetric region, for receiving, during each of said pulses, first and second images based on respective first and second different viewing perspectives relative to the volumetric region said holographic recording means comprising a single holographic film plate having a substantially planar receiving surface;

a referencing means for directing a first reference beam of coherent energy onto the holographic recording means during a first one of the pulses, and for directing a second reference beam of coherent energy onto the holographic recording means during a second one of the pulses, whereby the holographic recording means records four images including (i) first and second images based respectively on the first and second perspectives and corresponding to said first pulse, and (ii) third and fourth images based respectively on the first and second perspectives and corresponding to the second pulse;

an image forming optical assembly for collecting different first and second parts of the scattered coherent energy directing the collected energy toward the holographic film plate and focusing the collected energy to form said first and third images based on said first part of the scattered coherent energy, and said second and fourth images based on said second part of the scattered coherent energy, said images of the volumetric region being formed near the receiving surface;

said optical assembly collecting the first and second parts of the scattered coherent energy at respective first and second different locations to provide said first and second different viewing perspectives, and wherein the image forming optical assembly includes respective first and second subassemblies, each subassembly comprising a collection lens, a prism for selectively altering the direction of collected light received from the collecting lens, and a focusing lens receiving light from the prism and focusing the collected light near the receiving surface to form the associated image; and a means for distinguishing the images recorded during the first pulse from the images recorded during the second pulse.

2. The system of claim 1 wherein:

the coherent energy generating means includes a laser generating a pulsed laser energy beam, and beam shaping optics for collimating the laser energy beam at least along the portion thereof illuminating the volumetric region.

3. The system of claim 1 wherein:

each of the pulses has a duration of less than 100 nanoseconds.

4. The system of claim 1 wherein:

said means for distinguishing images includes a means for directing the first and second reference beams onto the holographic recording means at different angles relative to a receiving surface of the holographic recording means.

5. The system of claim 1 wherein:

the referencing means includes a means for directing a first portion of the laser energy beam along a first reference path toward the holographic recording means and means for directing a second portion of the laser energy beam along a second reference path toward the holographic recording means.

6. The system of claim 5 wherein:

The first and second reference beams intersect the holographic recording means at different angles.

7. The system of claim 1 further including:

a first reconstruction means for directing coherent energy onto the holographic recording means, to generate a holographic reconstruction of the volumetric region.

8. The system of claim 7 wherein:

said holographic reconstruction includes said first and third reconstructed images corresponding to said first viewing perspective during the first and second pulses, and said second and fourth reconstructed images corresponding to the second viewing perspective at the first and second pulses.

9. The system of claim 8 wherein:

the means for distinguishing comprises means for directing the first and second reference beams at respective and different first and second propagation directions toward the receiving surface; and the reconstruction means includes means for alternatively directing first and second reconstruction beams of coherent energy onto the holographic recording means in propagation directions opposite to the propagation directions of the first and second reference beams, respectively.

10. The system of claim 9 wherein:

the reference beams and the reconstruction beams have the same wavelength.

11. The system of claim 8 further including:

a CCD array, and means for selectively positioning the CCD array within the holographic reconstruction.

12. A system for stereo reconstruction of holographic images of a fluid flow; including:

a holographic storage medium, and holographic information stored onto the holographic medium, said information including four images comprised of pairs of images stored at respective first and second points in time, with each pair of images including an image corresponding to a different one of first and second different viewing perspectives relative to the volumetric region; and a means for selectively directing coherent energy onto the holographic storage medium, to generate alternatively first and second reconstructed images corresponding to the first viewing perspective at the first and second points in time, and third and fourth reconstructed images of the volumetric region corresponding to the second viewing perspective at the first and second points in time;

a first optical assembly for collecting light radiating at a first angle from the holographic recording medium, and directing the collected light to an image location to form the first and second reconstructed images; and a second optical assembly for collecting light radiated from the holographic recording medium at a second angle different from the first angle, and for directing the collected energy to form the at the image location; and a means for selectively blocking either one of the first and second optical assemblies whereby the image location receives light only from the other one of the optical assemblies.

13. The system of claim 12 further including:

a means for selectively positioning a CCD array within the image location.

14. A system for holographically recording and reconstructing images of a moving fluid, including:

means for directing coherent energy in the form of temporally spaced pulses through a fluid stream that includes a fluid and light scattering elements carried in the fluid, to illuminate a volumetric region within the fluid stream;

a holographic recording medium;

a first optical assembly for collecting light scattered in a first direction from the volumetric region, and for directing the collected light downstream onto the holographic recording medium;

a referencing means for directing a first reference beam of coherent energy onto the holographic recording medium at a first reference direction relative to the receiving surface;

a support means for maintaining the first optical assembly and the holographic recording medium fixed relative to one another;

a first alignment means for releasably fixing the support means aligned with respect to the energy generating means and with the volumetric region, whereby scattered coherent energy collected by the first optical assembly is directed downstream through the first optical assembly and then to the holographic recording medium in a first imaging direction;

a reconstruction beam generating means for generating a first reconstruction beam of coherent energy, with a wavelength equal to that of the first reference beam; and a second alignment means for releasably fixing the support means with respect to the reconstruction beam generating means such that the first reconstruction beam is propagated toward the holographic recording medium in a first reconstruction direction opposite to the first reference direction; and coherent energy of the first reconstruction beam projected through the holographic recording medium is collected by and transmitted upstream through the first optical assembly to a selected image site.

15. The system of claim 14 wherein:

the first reconstruction beam is the phase conjugate of the first reference beam, and has the same wavelength.

16. The optical system of claim 14 further including:

a second optical system integral with the support means and, when the support means is so aligned with the volumetric region, collecting scattered energy travelling from the volumetric region in a second direction different than the first direction and directing the collected energy downstream onto the holographic recording medium;

wherein coherent energy projected through the holographic recording medium further is collected by and transmitted upstream through the second optical assembly to the selected image site; and a means for selectively blocking either the first optical assembly or the second optical assembly whereby, when the support means and reconstruction generating means are so aligned, coherent energy from only the other of the optical assemblies is directed to the reconstruction image site.

17. The system of claim 16 further including:

a means for generating a second reference beam and directing the second reference beam onto the holographic recording medium at a second reference direction when the support means and energy generating means are aligned, said second reference direction being different from the first reference direction; and means for generating a second reconstruction beam which, when the support means is aligned with the reconstruction beam generating means, directs the second reconstruction beam onto the holographic recording medium in a second reconstruction direction opposite to the second reference direction, said second reconstruction beam being the phase conjugate of the second reference beam.

18. A process for holographically recording images of a moving fluid, comprising the steps of:

generating temporally spaced pulses of coherent energy, and directing the energy in a path that intersects a fluid flow to illuminate a volumetric region within the fluid flow and cause light scattering elements within the fluid and within the volumetric region to scatter the coherent energy;

collecting the scattered energy at a first viewing perspective relative to the volumetric region, and directing the scattered energy through an optical assembly onto a holographic recording medium;

collecting the scattered energy at a second and different viewing perspective relative to the volumetric region, and directing the scattered energy through the optical assembly onto the holographic recording medium;

directing a first reference beam onto the holographic recording medium during a first one of said temporally spaced pulses;

directing a second reference beam onto the holographic recording medium during a second one of said temporally spaced pulses;

directing collected energy from the optical assembly onto the holographic recording medium during the first and second temporally spaced pulses, thereby to record four particle images including (i) first and second images based on each of the first and second perspectives corresponding to the first one of said temporally spaced pulses, and (ii) third and fourth images based on each of the first and second perspective corresponding to the second one of said temporally spaced pulses;

after recording the particle images transferring the optical assembly and the holographic recording medium to an image reconstruction site while maintaining the optical assembly and recording medium fixed with respect to one another;

with the optical assembly and recording medium at the image reconstruction site, alternatively directing first and second reconstruction beams through the holographic recording medium while allowing transfer of the resulting holographic image through only the first optical assembly, to generate said first and third images corresponding to the first perspective at said first and second temporally spaced pulses respectively; and alternatively, directing the first and second reconstruction beams onto the holographic recording medium while permitting the transfer of the resulting holographic image only through the second optical assembly, to generate said second and fourth images corresponding to the second perspective of the volumetric region at the first and second temporally spaced pulses, respectively.

19. The process of claim 18 wherein:

the first and second reconstruction beams are the phase conjugates of the first and second reference beams respectively.

20. The process of claim 19 wherein:

the reference beams and reconstruction beams have the same wavelength, and wherein the step of directing first and second reconstruction beams further includes using the image as a guide to indicate correct alignment of the reconstruction beams.

21. The system of claim 13 further including:

a computing means, coupled to receive an output of the CCD array, for generating a first two-dimensional field of images as viewed from the first perspective based on said first and second images, and for generating a second two-dimensional displacement field of images as viewed from the second perspective based on said third and fourth images.

22. The process of claim 18 further including:

generating digital information representing said first and third images, and analyzing the information to provide a first two-dimensional displacement field of images as viewed from the first perspective; and generating digital information representing the second and fourth images, and analyzing the digital information to provide a second two-dimensional displacement field of images as viewed from the second perspective.

23. A system for holographically recording images produced by a moving fluid, including:

a means for generating coherent illuminating energy in the form of temporally spaced pulses, and for directing the pulsed energy in a path that intersects a fluid stream including a fluid and light scattering elements carried in the fluid, said pulsed energy illuminating a volumetric region within the fluid stream whereby the elements within the volumetric region scatter the coherent energy;

a holographic recording means spaced apart from the volumetric region, for receiving, during each of said pulses, first and second images based on respective first and second different viewing perspectives relative to the volumetric region, said holographic recording means including at least two holographic film plates spaced apart from one another to receive the scattered light traveling in different directions from the volumetric region and thereby provide said respective first and second viewing perspectives;

a referencing means for directing a first reference beam of coherent energy onto the holographic film plates during a first one of the pulses, and for directing a second reference beam of coherent energy onto the holographic film plates during a second one of the pulses, whereby the holographic film plates record four images including (i) first and second images based respectively on the first and second perspectives and corresponding to said first pulse, and (ii) third and fourth images based respectively on the first and second perspectives and corresponding to the second pulse; and a means for distinguishing the images recorded during the first pulse from the images recorded during the second pulse.

24. The system of claim 23 further including:

an image forming optical assembly for collecting a first portion of the light scattered from the volumetric region, directing the collected light toward the holographic film plates, and focusing the collected light to form a first image of the volumetric region near respective receiving surfaces of the holographic film plates.

25. The system of claim 24 wherein:

the image forming optical assembly further collects a second portion of the scattered light, directs the collected light toward the holographic film plates; and focuses the collected light to form a second image of the volumetric region near the receiving surfaces; said optical assembly collecting the first and second portions of the scattered light at respective first and second different locations to provide said first and second different viewing perspectives.

26. The system of claim 25 wherein:

the image forming optical assembly includes respective first and second subassemblies, each subassembly comprising a collection lens, a prism for selectively altering the direction of collected light received from the collecting lens, and a focusing lens receiving light from the prism and focusing the collected light near the receiving surface to form the image.

* * * * *